Nov. 12, 1957  L. D. COBB  2,812,839
ONE-WAY CLUTCH
Filed Feb. 18, 1954
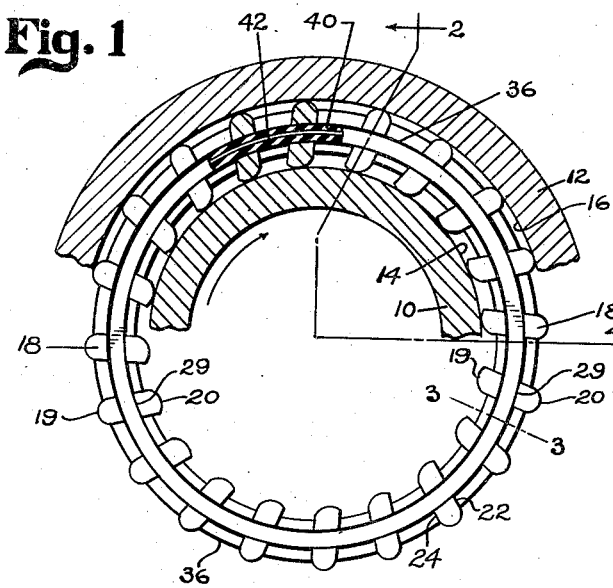
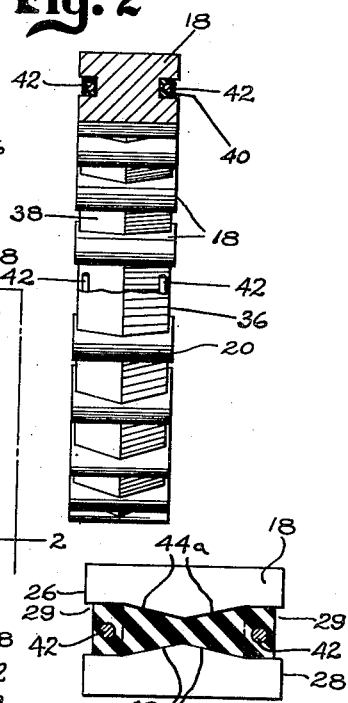
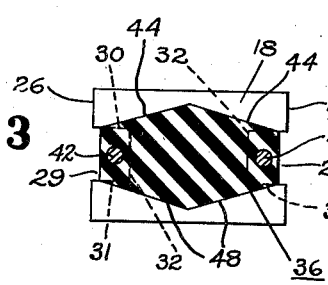
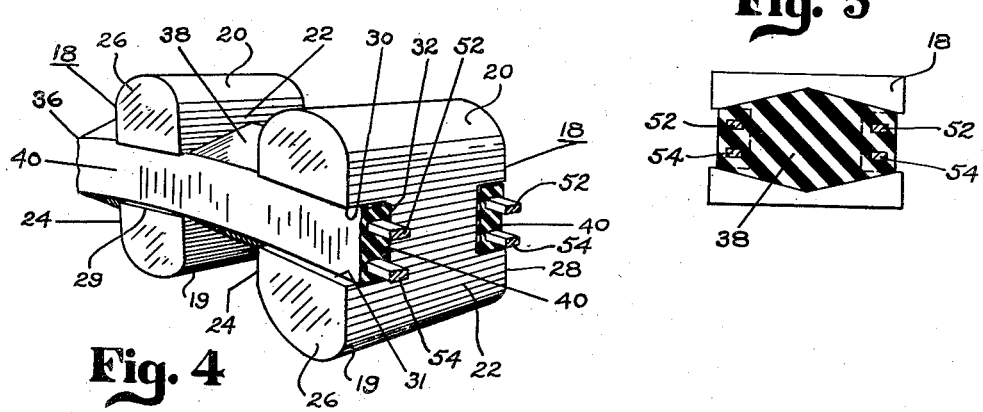
INVENTOR:
LELAND D. COBB
BY Edward H. Goodrich
HIS ATTORNEY.

United States Patent Office 2,812,839
Patented Nov. 12, 1957

2,812,839
ONE-WAY CLUTCH
Leland D. Cobb, Forestville, Conn., assignor to General Motors Corporation, Detroit, Mich., a corporation of Delaware Application February 18, 1954, Serial No. 411,103

8 Claims. (Cl. 192—45.1)

This invention relates to improvements in one-way clutches and particularly to clutch mechanisms wherein spaced grippers are held in assembled relation and yieldably urged towards a one-way driving connection between a pair of relatively rotatable members.

An object of the invention is to provide an improved one-way clutch assembly of inexpensive and simple construction which may be easily installed between a pair of concentric cylindrical surfaces to provide a uni-directional drive between these surfaces.

Another object is to provide an improved one-way clutch having spaced grippers in unit-handling relation with a resilient cage which urges each of the grippers towards clutch driving positions.

A further object resides in the provision of an improved unit-handling one-way clutch wherein a series of grippers are held in operative positions by a reinforced cage which resiliently supports the grippers.

A still further object is to provide an improved unit-handling one-way clutch having circumferentially spaced driving elements which are simultaneously urged in full phasing relation towards clutch driving positions under the influence of shear stresses in a reinforced cage of inherently resilient material.

To these ends and also to improve generally upon devices of this character, this invention consists in the various matters hereinafter described and claimed. In its broader aspects, the invention is not necessarily limited to the specific structure selected for illustrative purposes in the accompanying drawings wherein Figure 1 is a fragmentary end elevation partially in section and showing one embodiment of the invention.

Figure 2 is an end elevation partly in section and taken along the broken line 2—2 of Figure 1.

Figure 3 is an enlarged cross section taken along the line 3—3 of Figure 1.

Figure 3A is a cross section generally corresponding to Figure 2 but showing a modified cage.

Figure 4 is a fragmentary perspective view showing the mounting of a pair of grippers in a modified form of this invention; and Figure 5 is a cross section of the modified form of Figure 4 and taken between a pair of grippers.

In the embodiment of Figures 1, 2 and 3, I have provided a unit-handling clutch assembly for transmitting a one-way driving connection between a pair of relatively rotatable members such as a driving race ring 10 and a driven race ring 12, these rings being suitably held in coaxial relation and having the respective cylindrical surfaces 14 and 16. The one-way clutch driving engagement is effected through circumferentially spaced grippers or sprags 18 having arcuate inner and outer faces 19 and 20 arranged to be tilted into and out of wedged driving engagement with the cylindrical surfaces 14 and 16. In the illustrated form of Figure 1, when the race ring 10 is rotated in the direction indicated by the arrow, the arcuate faces 19 and 20 rock in frictional engagement with the raceways 14 and 16 causing the sprags 18 to be simultaneously tilted counterclockwise towards but not reaching radial positions and into wedged positive driving engagement with the race rings 10 and 12. When the race ring 10 is rotated in an opposite direction from that shown by the arrow, or when the outer race ring 12 overruns the inner race ring in the direction of driving rotation, the sprags tilt clockwise out of their driving positions and permit free relative rotation of the rings 10 and 12. The arcuate sprag faces 19 and 20 are preferably non-coaxial and have their axes laterally spaced from each other to aid the tilting of the sprags into and out of driving engagement. Also, the maximum distance between these inner and outer sprag faces 19 and 20 exceeds the radial distance between surfaces 14 and 16 so that the sprags 18 cannot shift into or past dead center radial driving positions to an inoperative driving relation.

The sprags may be generally rectangular in cross section with parallel side faces 22 and 24 and may have generally parallel end faces 26 and 28. The end of each sprag preferably has formed therein a groove 29 having top and bottom shoulders 30 and 31 interconnected by an inner wall 32. The grooves 29 are illustrated with parallel flat top and bottom walls and a flat inner wall. However, other shapes of grooves may be employed for the same purpose. The sprags are held in circumferentially spaced relation for operative driving engagement by an integral cage ring 36 of inherently resilient material and having peripherally spaced transverse portions 38 between adjacent sprags and having annular end portions 40 that extend through and substantially fill each of the end grooves 29 in the sprags. The width of the cage 36 preferably lies within the width of the sprags so that the flat end sprag faces may locate against annular shoulders if desired. This cage ring 36 may be composed of various molded rubber-like materials which will not deteriorate or materially change resiliency in the presence of heat, light and lubricant; one satisfactory material being a resilient vulcanized synthetic rubber containing a polymerization product of butadiene and acrylic nitrile.

The rubber-like cage 36 is preferably simultaneously molded and vulcanized in embracing relation to the sprags. However, if desired, this rubber-like cage may be independently molded and have circumferentially spaced pockets through which the sprags can thereafter be snapped into interfitting relation due to the deformable resiliency of the cage material. The sprags when initially located in the cage are preferably substantially radial to the annular cage. However, when the unit-handling clutch assembly is installed between the race ring surfaces 14 and 16, the sprags are each tilted silghtly out of radial positions as best indicated in Figure 1. This slight tilting of the sprags resiliently deforms the cage portions 38 between adjacent sprags and also resiliently distorts the annular portions 40 with respect to their interfitting relation in the end grooves 29. This deformed relation of the cage with respect to the sprags results in shear stresses in the inherently resilient cage which yieldably urges each of the sprags simultaneously towards clutch driving positions. Hence, rotation of the inner ring 10 in a driving direction as indicated results in an immediate clutch driving connection to the race ring 12; and a reversed rotation of the ring 10 or an overrunning of the ring 12 causes an immediate clutch release due to the inherent resiliency of the cage 36.

The annular and cage portions 40 are preferably reinforced by embedded rigid rings 42 preferably vulcanized in position and which serve the dual function of holding the cage in annular shape and of resisting any tendency of the cage 36 to stretch circumferentially. Also, the rigidity imparted by the rings 42 provides a generally central zone intermediate of the shoulders 30 and 31 about which each sprag 18 may tiltably move. The initial tilting of the sprags sets up compressive deformation and shear stresses in the rubber-like portion 40 between the rigid ring 42 and the opposed side faces 30 and 31 of each of the sprags thus resiliently urging all sprags towards operative positions. The cage portions 38 between each of the sprags are preferably provided with divergent upper sloping outer faces 44 and correspondingly diverging faces 48 on its inner periphery. Dependent upon the resiliency of the rubber-like material of the cage 36, various angles may exist between the surfaces 44 and between the corresponding surfaces 48 and if desired these surfaces may even be inwardly sloping towards each other as indicated at 44a, and 48a in Figure 3A.

In the modified embodiment of Figure 4, the reinforcing rings 42 are replaced at each end of the sprags 18 with a pair of substantially coaxial reinforcing rings 52 and 54 bonded in the inherently resilient cage ring. These reinforcing rings 52 and 54 are preferably rectangular in cross section and spaced from each other through a greater distance than that of the ring 52 to the adjacent sprag shoulder 30 and that of the ring 54 to the adjacent sprag shoulder 31. With this arrangement, the shear deformation of the cage between the reinforcing rings 52 and 54 provides for a slight relative circumferential movement of one reinforcing ring with respect to the other so that a full phasing or correspondingly tilting movement of all sprags occurs upon relative race ring rotation whereupon all sprags will simultaneously shift into operative positions and each will assume an equal portion of the clutch driving load.

I claim:

1. A one-way clutch for driving connection between a pair of inner and outer coaxial annular raceways comprising a cage ring of rubber-like material which is resiliently deformable in all directions, the cage having a plurality of circumferentially spaced openings therethrough, spaced grippers resiliently held by the cage and respectively extending through said openings for engagement with the raceways, and a reinforcing ring embedded in each end of the cage and spaced from the grippers.

2. A one-way clutch for driving connection between a pair of inner and outer coaxial annular raceways comprising a cage ring of rubber-like material that is resiliently deformable, the cage having a plurality of circumferentially spaced openings, spaced grippers matingly held by the cage in said openings and projecting therefrom for driving engagement with the raceways, the cage ring being radially narrower at its ends than at its intermediate portion between the grippers, and an annular reinforcing member embedded in the cage and located in spaced relation to the grippers, said reinforcing member holding the cage generally circular and restricting circumferential stretching of the cage.

3. A one-way clutch for driving connection between a pair of inner and outer coaxial annular raceways comprising a cage ring of resilient molded rubber-like material and having a plurality of circumferentially spaced openings, spaced grippers matingly and yieldably gripped intermediate of their ends by the cage in said openings and bonded to the cage, the grippers projecting from said openings for driving engagement with the raceways, the cage ring being laterally wider at its ends than at its intermediate portions between the grippers, the cage between the grippers having arcuate walls which slope inwardly towards each other from the ends of the cage, and an annular reinforcing ring embedded in the cage to hold the cage generally circular and to restrict circumferential stretching of the cage, said reinforcing ring extending through each gripper and located in spaced relation to each gripper.

4. A one-way clutch for driving connection between a pair of relatively rotatable coaxial annular raceways comprising a deformably resilient cage ring of rubber-like material for insertion between the raceways and having a series of circumferentially spaced openings, spaced grippers extending through the openings for raceway engagement, the grippers being resiliently held by the cage, each gripper having a recessed portion, and a reinforcing ring bonded to the rubber-like cage ring and extending through said recessed portions in spaced relation to each of said grippers.

5. A one-way clutch for driving connection between a pair of relatively rotatable coaxial annular raceways comprising a deformably resilient cage ring of rubber-like material for insertion between the raceways and having a series of circumferentially spaced openings generally radially extending therethrough, spaced grippers extending through the openings for raceway engagement, the grippers being resiliently embraced by the cage, shoulders on the grippers overlying end portions of the cage, and a reinforcing ring embedded within the cage and extending between and in spaced relation to the shoulders on each gripper.

6. A one-way clutch for driving connection between relatively rotatable cylindrical raceways comprising a series of circumferentially spaced grippers arranged to be tilted into and out of wedged driving connection with the raceways, each of said grippers having an end recess, an annular inherently resilient cage for insertion in spaced relation between the raceways and having a series of peripheral spaced openings that matingly and respectively receive said grippers, an annular cage portion substantially filling the gripper recesses, a pair of radially spaced reinforcing rings embedded within and bonded to an end of the cage, said rings extending through the recessed portions of the grippers and spaced from the walls of the recesses.

7. A one-way clutch for driving connection between relatively rotatable coaxial annular raceways comprising a series of circumferentially spaced grippers having arcuate top and bottom faces arranged to be rocked into and out of raceway engagement, each of the grippers having an end recess provided with opposed walls, an annular inherently resilient molded cage of rubber-like material for insertion between the raceways and having peripherally spaced openings that matingly receive the grippers, an annular cage portion extending through the recesses and bonded to the recess walls, reinforcing rings in radially spaced relation and embedded in the annular cage portion, and said rings extending through the recesses in closer spaced relation to the recess walls than that of the spacing of the reinforcing rings from each other.

8. A one-way clutch for driving connection between relatively rotatable cylindrical coaxial raceways comprising a series of circumferentially spaced grippers arranged to be tilted in unison into and out of wedged driving connections with the raceways, an annular inherently resilient cage arranged to be located between the raceways and having a series of peripherally spaced openings that matingly receive the grippers and through which the grippers extend for operative engagement with the raceways, each of the grippers having in its end a groove provided with a pair of opposed shoulders, an annular end portion of the cage extending through and substantially filling the gripper grooves, a pair of reinforcing rings bonded to and embedded within the annular end cage portion, and said reinforcing rings extending through said recesses in proximity to the shoulders and being relatively circumferentially movable with respect to each other whereby the reinforcing rings and cage portions which engage the shoulders will provide for simultaneous tilting of all of the grippers into and out of operative positions.

References Cited in the file of this patent

UNITED STATES PATENTS

| | | |
|---|---|---|
| 2,520,004 | Gondek | Aug. 22, 1950 |
| 2,555,484 | Gruenberg et al. | June 5, 1951 |
| 2,614,670 | Heintz | Oct. 21, 1952 |
| 2,624,436 | Gamble | Jan. 6, 1953 |